Patented Jan. 16, 1951

2,537,955

UNITED STATES PATENT OFFICE 2,537,955

ENAMEL OPACIFIER AND METHOD OF USE

William J. Baldwin, Snyder, N. Y., assignor, by mesne assignments, to National Lead Company, New York, N. Y., a corporation of New Jersey No Drawing. Application December 14, 1946, Serial No. 716,429

2 Claims. (Cl. 106—48)

The present invention relates to a mill addition opacifier for use in vitreous enamels and particularly to an opacifier for use with zirconium opacified frits of the type which develop opacity on heating in the enameling cycle.

In the enameling of metal and particularly sheet iron and steel, the ultimate object is to obtain a vitreous coating upon the metal base which presents a high degree of opacity as this is an esthetic requirement in enameling, as great a coverage as possible and a finished vitreous coating resistant to strains and impact incident to assembly, storage, transportation or use.

A very important feature of a finished enamel article and, therefore, of the enamel to be applied to the article, is the diffuse reflectance or opacity of the enamel coating. In general, the opacity may be obtained by adding materials to the glass composing the frit as, for instance, certain compounds of fluorine or antimony, to mention but two of the more popular older types, or zircon as a more recent opacifier. Or, opacifiers may be added to the frit subsequent to its manufacture and milled therewith as a separate individual ingredient, so-called mill addition opacifiers.

Vitreous enamel coatings of exceptional properties have been produced in recent years which depend for their opacity upon the presence of compounds of zirconium in the frit. Patent Nos. 1,944,938 of January 30, 1934, to C. J. Kinzie and 2,326,348 of August 10, 1943, to Frost and Commons relate to enameling or glazing frit compositions depending upon zircon type opacifiers to obtain relatively high reflectance values; additional phases of this important field are described in patents to Bahnsen et al. Nos. 2,250,456 and 2,250,457 of July 29, 1941 and 2,324,812 of July 20, 1943. Frits of this type develop opacity in the enameling cycle, in contrast, with frits of other types wherein the opacity is already developed in the manufacture of the frit.

In general, the greater the amount of an opacifier in a frit, the higher the opacity of the finished enamel; however, it is known that, at times, surface difficulties in the enamel may be caused by attempts to include too great an amount of an opacifier in the frit glass. These surface difficulties decrease the esthetic value of the enamel coating and, therefore, in effect, defeat one of the purposes of the addition of the opacifier.

In accordance with the present invention the opacity of zirconium opacified frits of the type which develop opacity on heating the frit during the enameling cycle may have their opacity increased by the employment of specially prepared opacifiers containing aluminum oxide and phosphorus pentoxide. These special opacifiers are synthetically prepared from materials providing aluminum oxide and phosphorus pentoxide by calcining such materials with the production of an end product which when finely ground and used as a mill addition increases the reflectance value of the finished enamel. In Serial No. 629,912 filed November 20, 1945, by William J. Baldwin, now Patent No. 2,500,231, there is discussed an enamel opacifier containing zirconium oxide, phosphorus pentoxide and aluminum.

In accordance with the present invention the special mill addition opacifier consisting substantially entirely of phosphorus pentoxide and aluminum oxide may be prepared by suitably combining materials containing these materials or by combining the oxides themselves under suitable calcining conditions. Thus, the opacifier may be prepared from a mixture of suitable raw material containing the oxides mentioned, or of the oxides themselves, by calcining such mixture at temperatures above about 1600° F. and generally in the neighborhood of 2,000° F., or at such other temperature at which ceramic combination of the compounds occurs to produce a relatively homogeneous sinter. The time required will be from about ½ hour to about 2 hours. After calcining the batch, the resultant product is thoroughly pulverized to an appropriate fineness, that is, on the order of ½ to 1 micron, and preferably as near the lower limit as possible. The product so prepared, when used to the extent of about 2–4% as a mill addition to a commercial zirconium opacified frit of the type developing opacity during the enameling cycle, increased the reflectance value of the final enamel as compared to the reflectance value of an enamel obtained without the presence of such mill addition material. In general, the composition of the mill addition opacifier of the present invention comprises the binary system aluminum oxide and phosphorus pentoxide within the range 50 to 75% $Al_2O_3$, 50 to 25% $P_2O_5$. One of the resultant opacifier compositions in this range is a product with a calculated molar composition of approximately $3\ Al_2O_3 \cdot P_2O_5$.

Where the pure oxides are not employed as raw materials from which the mill addition of the present invention is manufactured, accepted raw material used in the manufacture of enamel frits will be found suitable, that is to say, amblygonite, aluminum oxide, aluminum metaphosphate or other accepted sources of raw material.

As specific examples merely illustrative of the invention but not limitative thereof, raw batches were made as shown in the following examples by grinding the materials of the raw batch together and heating the batch to about 2000° F. for one hour. The product of the calcination was then ground by wet milling the same until a particle size of about 1 micron or less was obtained. Two parts of the resulting ground opacifier was added for each 100 parts of frit and milled therewith, the composition in the mill being as follows:

100 parts frit
6 parts micronized clay
2 parts special opacifier
0.1 part sodium nitrite
42 parts water The mixture in the mill was wet ground to a fineness of 3 to 4% residue on a 200 mesh screen. The resulting slurry was applied to 4" x 6" standard test plates at rates of 30, 40, 50 and 60 grams per square foot application and then fired at 1520° F. for three minutes. The reflectance values of the resulting enameling plates were determined in the usual way by means of a Hunter reflectometer. The composition of the samples is given in Table I and the reflectance values are given in Table II.

*Table I*

| Sample | Per cent $Al_2O_3$ | Per cent $P_2O_5$ | Composition—Parts by weight |
|--------|--------------------|--------------------|------------------------------|
| A      | 68                 | 32                 | Alumina Metaphosphate—39, Alumina Hydrate—93. |
| B      | 75                 | 25                 | Amblygonite—53.5, Alumina Hydrate—87.5. |
| C      | 50                 | 50                 | Amblygonite—107, Alumina Hydrate—22. |

*Table II*

| Application Wt., grams/sq. ft. | Reflectance Values | | | |
|---|---|---|---|---|
| | Composition | | | Frit No. Opacifier |
| | A—2% | B—2% | C—2% | |
| 30 | 70.2 | 70.0 | 68.0 | 66.4 |
| 40 | 74.8 | 74.8 | 75.6 | 73.2 |
| 50 | 78.5 | 77.5 | 79.2 | 76.2 |
| 60 | 80.0 | 80.3 | 79.4 | 78.6 |

The milled zirconium opacified frit having the special mill addition opacifier of the present invention added to it produced an enameled surface having a considerably greater reflectance at the same rate of application than the frit itself as set forth above in Table II. The commercial zirconium opacified frits of the type which develop opacity during the enameling cycle and to which the mill addition opacifiers of the present invention may be added with advantage may possess the following approximate composition:

|                 | Per cent |
|-----------------|----------|
| $SiO_2$         | 25–40    |
| $Al_2O_3$       | 7–16     |
| $B_2O_3$        | 10–20    |
| $KNaO$          | 10–16    |
| $CaO$           | 3–7      |
| $F_2$           | 5–10     |
| $ZrO_2$         | 10–15    |
| $ZnO$           | 2–14     |
| $P_2O_5$        | 0.5–3    |
| $TiO_2$         | 0–2      |

The preferred composition of the special mill addition opacifier of the present invention is within the range 50%–75% $Al_2O_3$ and 50%–25% $P_2O_5$. Calcined compositions consisting of $Al_2O_3$ and $P_2O_5$ without this range do not produce acceptable reflectance values probably by reason of increased solubility of such an opacified composition in the frit when heated during the enameling. It will be understood that the usual amounts of clay, electrolyte and the like are added in the mill in the usual way when preparing the enamel slurry.

What is claimed is:

1. The method of increasing the opacity of an enamel frit composition of the zirconium opacified type wherein the opacity is developed in the enameling cycle which comprises adding to the enamel as a mill addition opacifier 2 to 4% by weight of a finely ground calcined material containing 50 to 75% aluminum oxide and 50 to 25% phosphorus pentoxide as the essential ingredients.

2. A calcine suitable for use as a mill addition opacifier for enamel frits of the zirconium opacified type which develop opacity on heating, which contains 50 to 75% aluminum oxide and 50 to 25% phosphorus pentoxide as the essential ingredients.

WILLIAM J. BALDWIN.

REFERENCES CITED

The following references are of record in the file of this patent:

UNITED STATES PATENTS

| Number | Name | Date |
|--------|------|------|
| 1,654,404 | Blumenberg | Dec. 27, 1927 |